(12) United States Patent
Gestermann et al.

(10) Patent No.: US 6,251,239 B1
(45) Date of Patent: Jun. 26, 2001

(54) ELECTROCHEMICAL GASEOUS DIFFUSION HALF CELL

(75) Inventors: Fritz Gestermann, Leverkusen; Hans-Dieter Pinter, Wermelskirchen; Jens Camphausen, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/297,206

(22) PCT Filed: Oct. 31, 1997

(86) PCT No.: PCT/EP97/06030

§ 371 Date: Apr. 27, 1999

§ 102(e) Date: Apr. 27, 1999

(87) PCT Pub. No.: WO98/21384

PCT Pub. Date: May 22, 1998

(30) Foreign Application Priority Data

Nov. 13, 1996 (DE) .............................................. 196 46 950

(51) Int. Cl.[7] .................................................. C25B 9/00
(52) U.S. Cl. .......................................... 204/265; 204/266
(58) Field of Search ................................... 204/265–266, 204/283, 256, 258, 279, 263

(56) References Cited

U.S. PATENT DOCUMENTS

| 4,436,608 | | 3/1984 | Bennett et al. ...................... 204/265 |
| 4,657,651 | * | 4/1987 | Wainerdi ............................... 204/265 |
| 4,705,614 | * | 11/1987 | Morris ............................... 204/263 X |
| 4,732,660 | * | 3/1988 | Plowman et al. .................... 204/265 |
| 4,744,873 | * | 5/1988 | Sorenson ......................... 204/265 X |
| 5,693,202 | | 12/1997 | Gestermann et al. ............... 204/265 |

FOREIGN PATENT DOCUMENTS

| 4444114C2 | 9/1996 | (DE) . |
| 19622744C | 7/1997 | (DE) . |
| 97/47787 | 12/1997 | (DE) . |
| 104137A | 3/1984 | (EP) . |

* cited by examiner

*Primary Examiner*—Donald R. Valentine
(74) *Attorney, Agent, or Firm*—Norris McLaughlin & Marcus

(57) ABSTRACT

This invention relates to an electrochemical half cell having a gas diffusion electrode as an anode or cathode, in which the gas space behind the gas diffusion electrode is optionally partitioned, for pressure equalization, into gas compartments which are joined to the gas diffusion electrode and which can be removed from the half cell or changed as a unit.

11 Claims, 7 Drawing Sheets

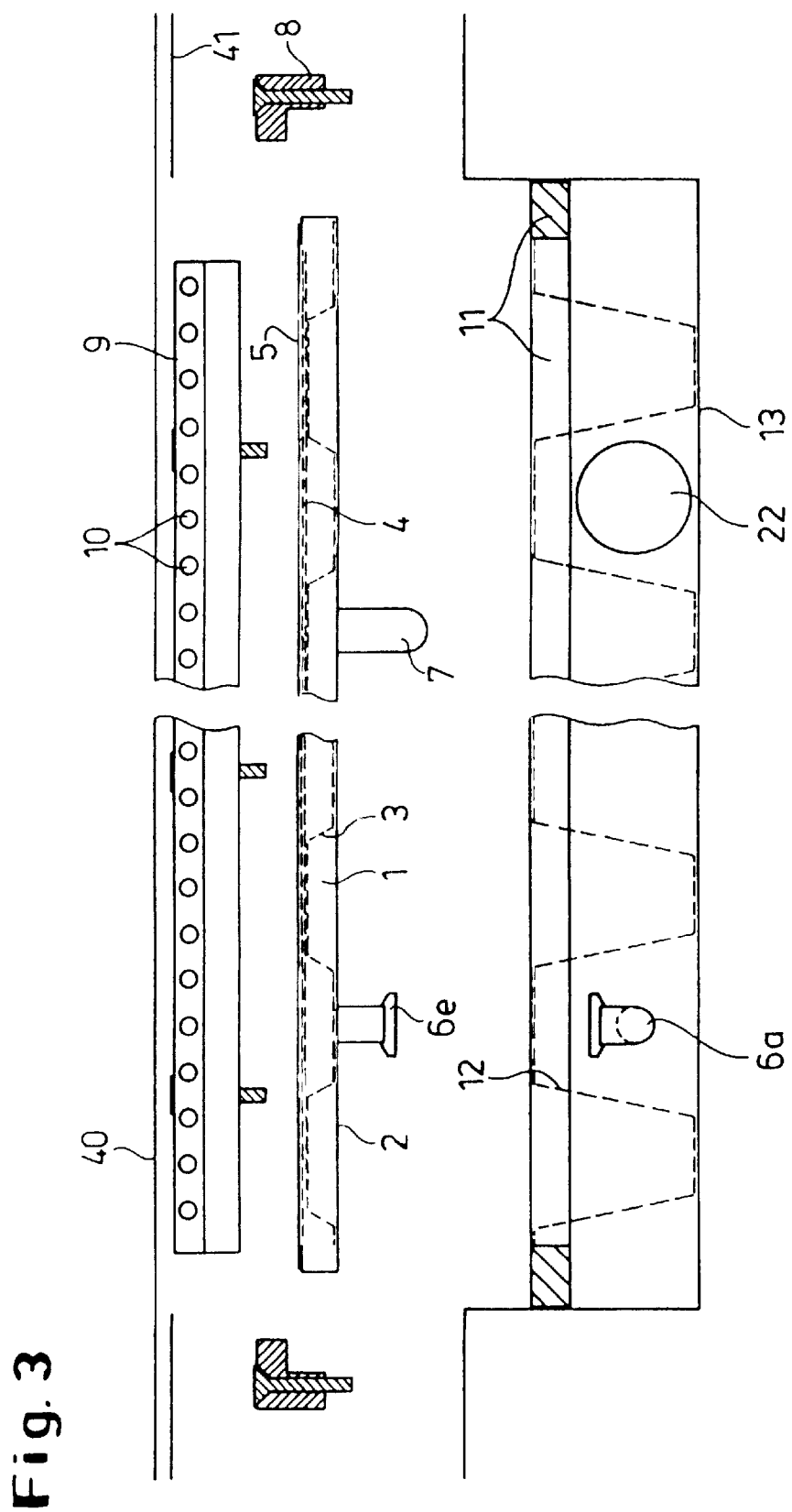

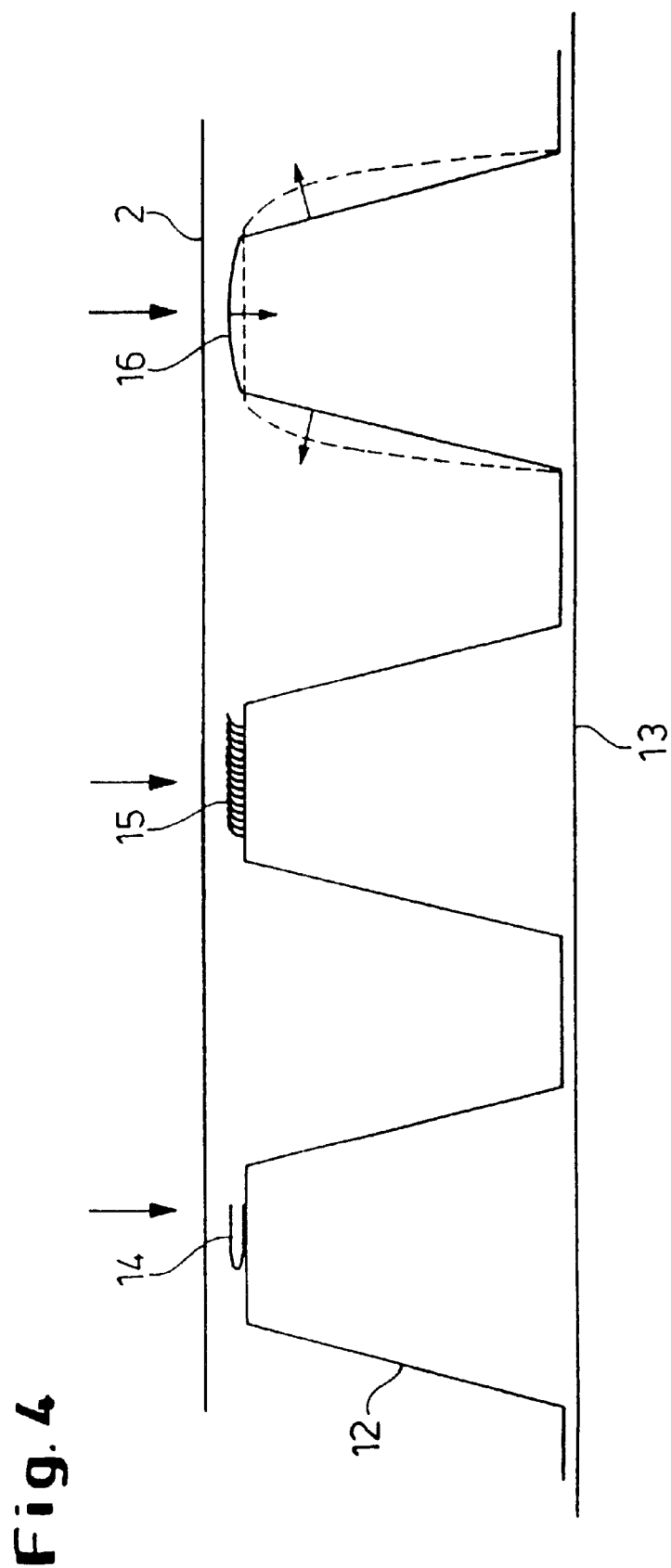

ELECTROCHEMICAL GASEOUS DIFFUSION HALF CELL

The use of gas diffusion electrodes in pressure-equalised electrochemical cells of large overall height necessitates the partitioning of the gas space into segments situated one above another, which are termed gas compartments, and which in the respective edge region have to be in contact with the electrode and sealed so that they are gas-tight. A half cell which has a basic construction such as this is described in DE 44 44 114 Al. A disadvantage of the mode of construction disclosed in DE 44 44 114 is the comparatively elaborate manner of making contact with and sealing the gas diffusion electrode. It is desirable for the electrode to be placed in electrical contact with the gas compartment and sealed in the smallest possible space, in order to keep the area of the electrode which is inactive as regards the electrode reaction as small as possible.

The object of the present invention is to provide an electrochemical gas diffusion half cell which makes it possible to utilise the active electrode area as extensively as possible, wherein the electrode together with the gas compartment is optionally fashioned as a module so that it is removable, thus permitting prior electrode installation in the gas compartment so that the edge contact is gas-tight, and so that making electrical contact for the operation of the gas diffusion electrode in the half cell is simplified.

A further object of the invention is to fashion the half cell and the electrode- and gas compartment module in particular so that modules of the half cell can also be replaced in a simple manner by a conventional electrode, for example a nickel electrode which produces hydrogen.

This object is achieved according to the invention by providing compartments fitted with gas diffusion electrodes such that said compartments can be removed from the half cell, optionally even individually, and can be detached from their gas supply or pressure equalisation means and from the electrical connections. In this respect, the gas compartments are manufactured as compact shallow elements, the front face of which is blanked off by the gas diffusion electrode so that when the electrode is installed in the half cell no electrolyte emerges into the gas space and no gas emerges in the opposite direction from the gas compartment.

The present invention relates to an electrochemical half cell based on a gas diffusion electrode as cathode or anode, having a gas space, which is formed from one or more gas compartments, for the gas diffusion electrode, having an ion exchange membrane, a holding structure for the installation of the electrode, electrical connections for the electrode, a gas inlet to the gas compartment and a pressure-equalised gas outlet to the gas compartment, a electrolyte feed line and an electrolyte discharge line, and having a housing for receiving the cell constituents, which is characterised in that the gas diffusion electrode is joined to the gas compartment to form a module which is detachably fastened to the holding structure, wherein the gas inlet and the gas outlet form a detachable connection to the gas compartment.

In one preferred embodiment, the gas space is partitioned into a plurality of gas compartments which are optionally supplied with electrode gas independently of each other, and which are optionally pressure-equalised in relation to the electrolyte space located in front of the gas diffusion electrode.

A half cell is particularly preferred in which, when there is a plurality of individual gas compartment modules, the individual modules are detachably fastened to the holding structure independently of each other.

Embodiments are also particularly preferred in which the gas diffusion electrodes are fastened to the gas compartment in an easily detachable manner so as to permit their replacement by modified electrodes.

The gas inlet and gas outlet are preferably designed as a flexible hose connection to which the gas compartment is attached, and which makes it easier to remove the gas compartments after the ion exchange membrane has been removed.

Alternatively, it is also possible in particular to employ gas inlets manufactured as a coupling seal and designed as bubble channels, and correspondingly pressure-equalising immersed elements.

In another preferred form of the half cell according to the invention the gas compartment modules are positioned in the half cell with the aid of structural elements, are electrically connected to the external power supply and are optionally sealed to such an extent that electrolyte from the electrolyte gap through which flow occurs cannot overflow in an uncontrolled manner into the rear, pressure-equalised space of the gas compartment, wherein the structural elements position the gas compartment modules so that the gas diffusion electrodes can serve simultaneously as an electrolyte gap for the passage of the electrolyte into the electrolyte space between the gas diffusion electrode and the ion exchange membrane.

The electrical contact between the gas compartment modules and an external source of electric current, e.g a source connected to the half cell housing, can be improved in that, in addition to the press contacts in the edge region, the modules are brought into electrical contact with the aid of an auxiliary structure, which is in pressed contact with the half cell housing for example, from the rear face thereof, namely the face remote from the gas diffusion electrode, via flexible, electrically conducting contact elements (e.g. spring contacts).

A low resistance supply of electric current to the electrode is made possible due to the electrical contact in the edge region and due to the contact of the electrode, which is distributed over the area of the electrode.

In another preferred variant of the half cell according to the invention, the gas diffusion electrode is brought into electrical contact on its side facing the gas space of the gas compartment with the aid of a support grid on its face. The support grid is thereby in electrical contact with the gas compartment rear wall.

A possible additional channel which is formed at the lower edge between the gas diffusion electrode and the gas compartment can serve to receive condensate which may possibly arise. The condensate can be discharged into the rear electrolyte space, together with the excess gas, via the gas outlet situated at the lowest point.

In one preferred variant, any heterogeneity in the supply of fresh electrolyte to the electrolyte space situated in front of the gas diffusion electrode can be prevented by providing the half cell behind the electrolyte feed line with an additional electrolyte distributor which homogenises the flow of electrolyte over the width of the half cell. In this embodiment, there is optionally no flow through the pressure-equalising rear space. The rear space only communicates with the flow of electrolyte at the top end of the half cell.

One particular advantage of the mode of construction of the half cell according to the invention is the possibility of easily operating the half cell also, when the gas compartment module is replaced, using conventional electrodes, particularly electrodes which produce hydrogen, e.g. nickel electrodes. In one preferred variant, the gas compartment modules are therefore fashioned so that they can be replaced by conventional electrodes, wherein the gas feed line to the gas compartment can optionally be blanked off or removed.

The present invention also relates to the use of the electrochemical half cell according to the invention in an electrochemical cell particularly an electrolysis cell, for operation according to choice with gas compartment modules or with conventional electrodes, particularly with electrodes which produce hydrogen, especially activated nickel electrodes.

The invention is explained in more derail below with reference to the Figures, where.

FIG. 3 is an interrupted longitudinal section through an open half cell along line A—A' in FIG. 1, with the ion exchange membrane and gas compartment module removed from the cell housing;

FIG. 4 shows a detail from FIG. 2 to explain the placement of the gas compartment in electrical contact;

Figure 1:
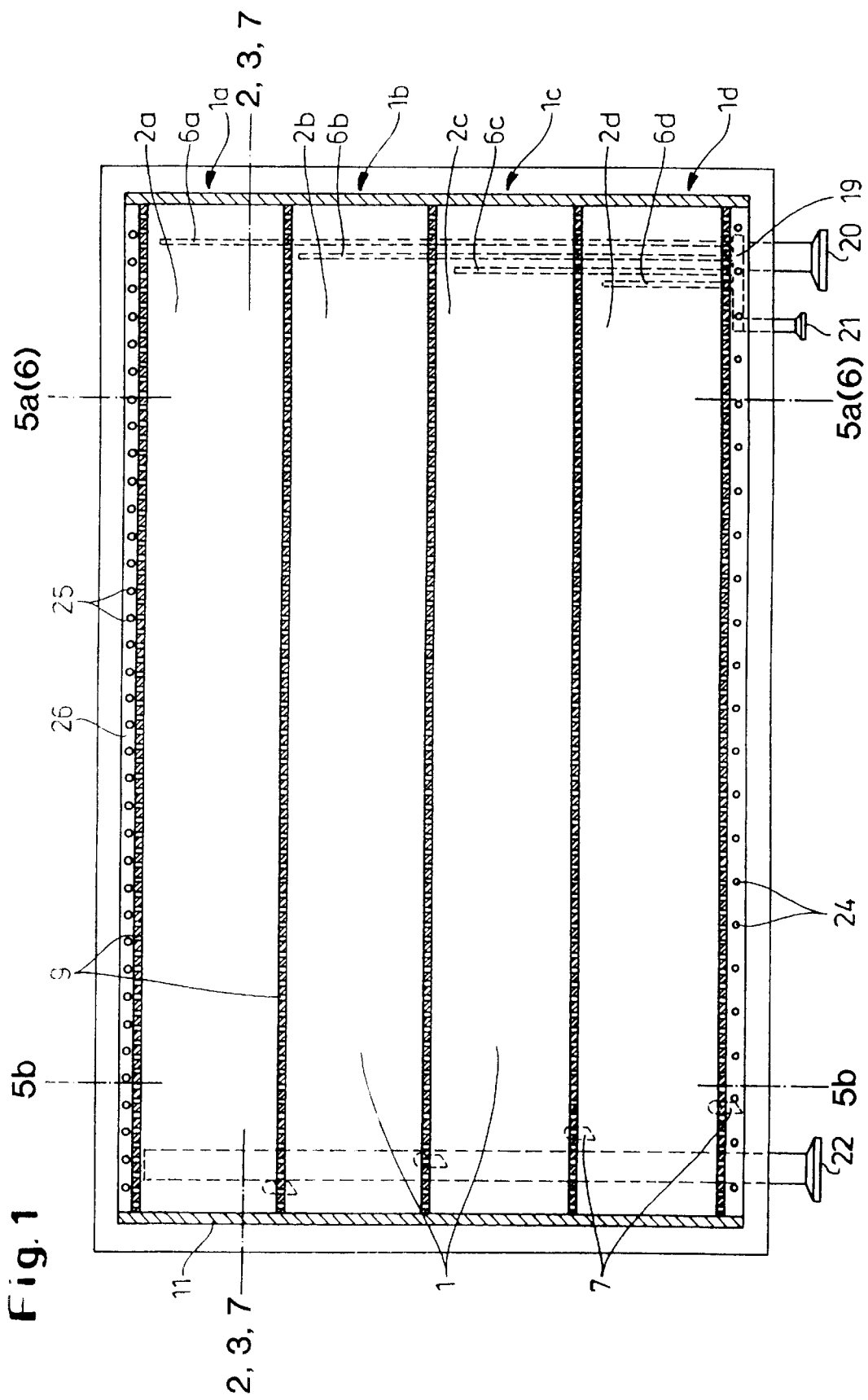
FIG. 1 is a cross-section through the half cell according to the invention as viewed from the ion exchange membrane towards the gas diffusion electrodes and the holding devices for the gas compartments situated therebetween.
Figure 6:
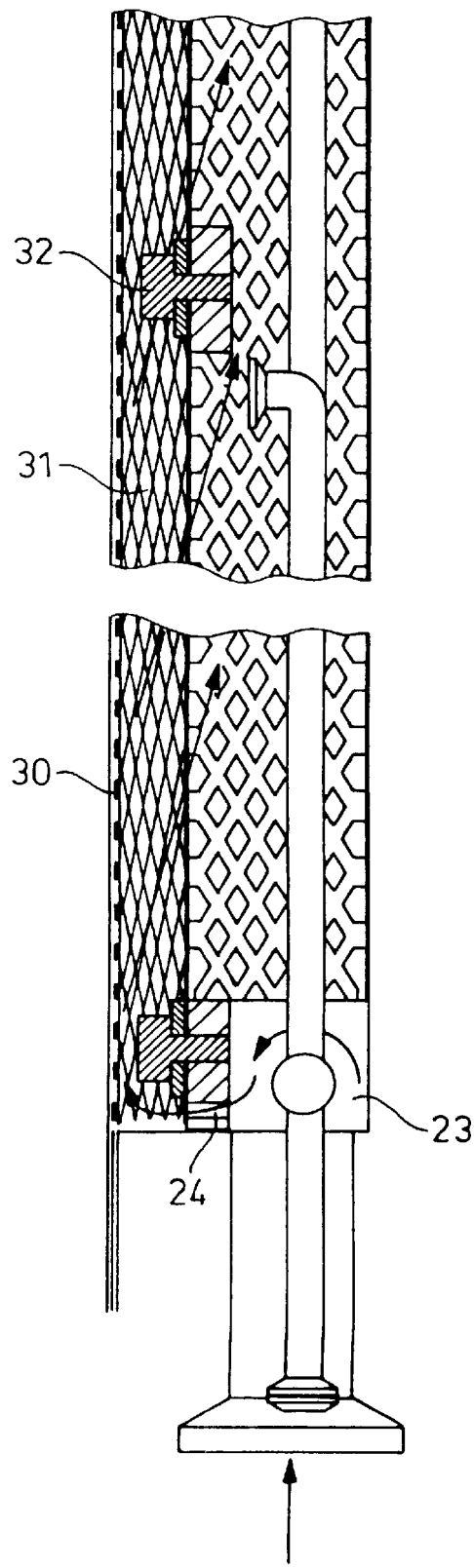
Figure 7:
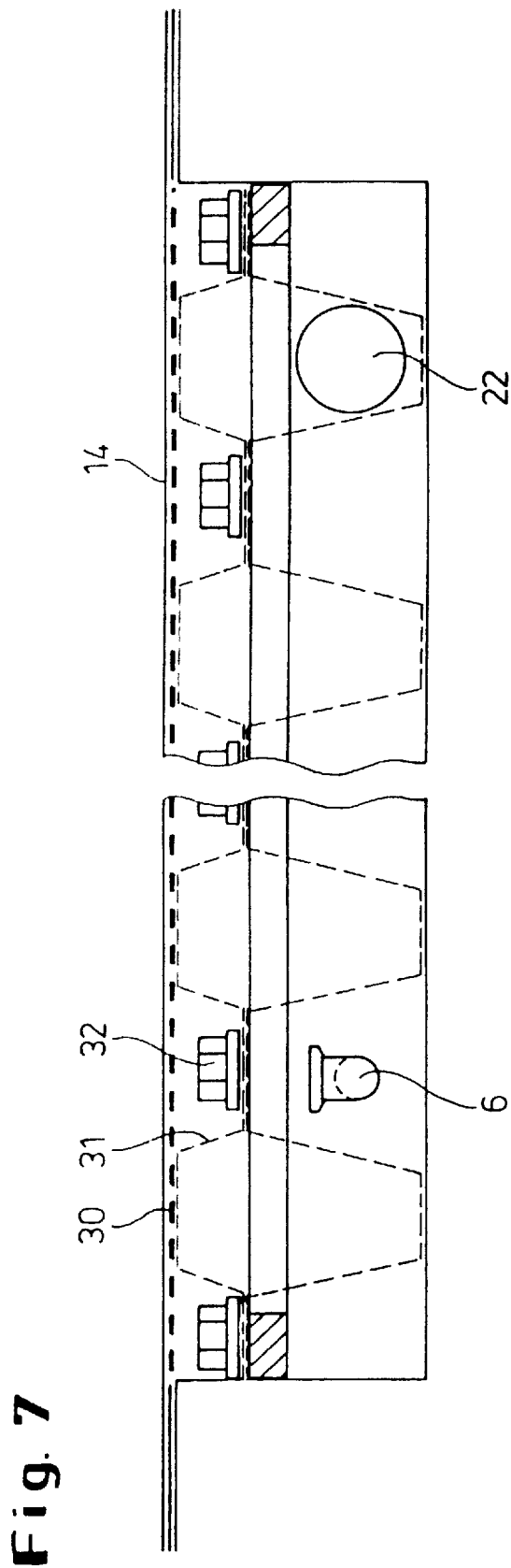

FIG. 6 is a partial cross-section through a half cell, along line D—D' in FIG. 1, in which the gas compartment modules have been replaced by a conventional nickel electrode 30 with the supporting structure 31; and FIG. 7 is a longitudinal section, corresponding to that along line A—A' in FIG. 1, through the variant of the half cell shown in FIG. 6 in operation with a nickel electrode 30.

EXAMPLES

Example 1

Figure 2:
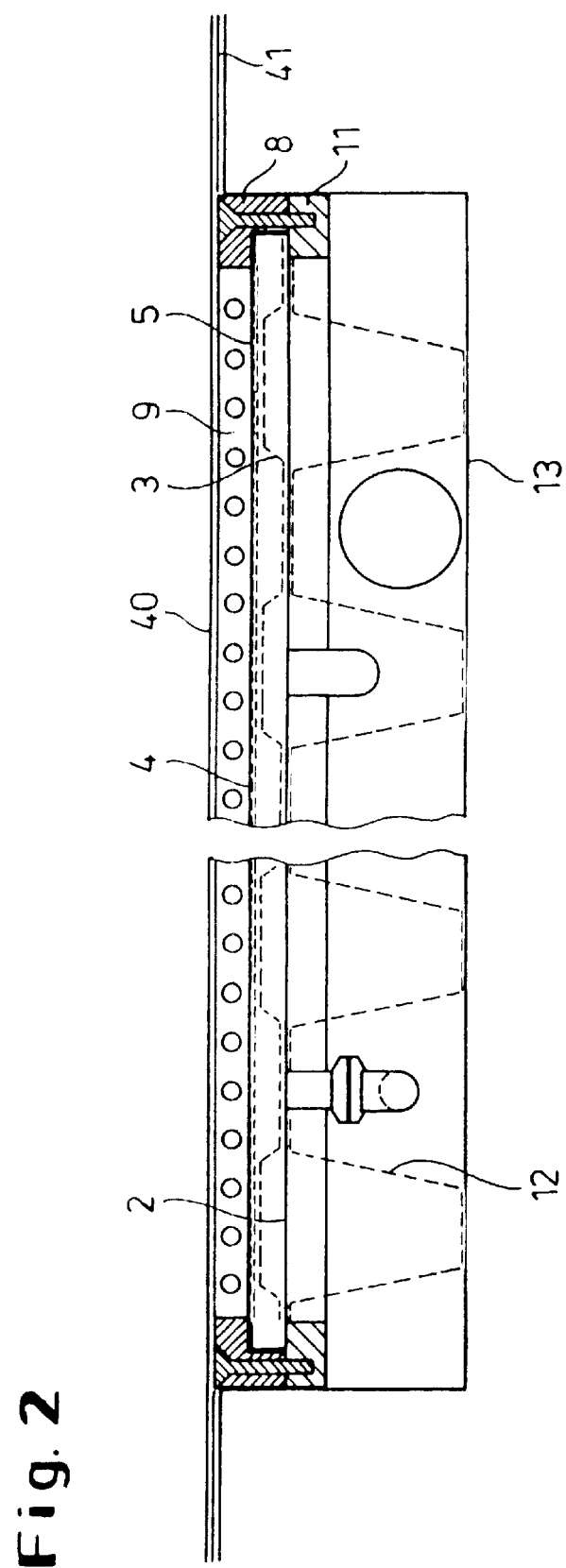
FIG. 2 is an interrupted longitudinal section through a closed half cell along line A—A' in FIG. 1.

An electrochemical half cell is constructed as follows:

A mounting structure 11 and an auxiliary structure 12, which is connected to an external power lead (not shown), are fixedly anchored in a shell-like housing 13 which is impervious to electrolyte (see FIG. 3). A gas line 21 (see FIG. 1), an electrolyte feed line 20 and a combined electrolyte and gas outlet line 22 are led into the housing. The gas compartment unit 1, which comprises the gas diffusion electrode 5, is fixed on the holding structure 11 in the housing 13 by means of vertical clamping strips 8 and horizontal clamping strips 9. The half cell is closed by the membrane 40, which is seated on the surrounding edge of the housing 13 via a seal 41 (see FIG. 2), and is pressed, so that it is impervious to electrolyte, on the surrounding edge of the housing 13, e.g. by the flange-mounting of a further half cell, which is not shown. The flexible lines 6a, 6b, 6c, 6d (see FIG. 1) which lead off from the gas distributor are connected to the gas compartment unit via flanged connections to supports 6e in each case.

The embodiment shown in FIG. 1 is partitioned into four gas compartments 2a, 2b, 2c, 2d, which are each provided with pressure equalisation via gas overflow lines 7. The gas compartment 1 consists of the metal housing 2, which is connected to the current-carrying auxiliary structure 12 at pre-arched structural parts 16 via current contacts, e.g. spring contacts 14 or brush contacts 15, or by direct contact (see the details shown in FIG. 4). The further supply of current is effected via the metal process contacts between the clamping strips 8, 9 and the holding structure 11, via the edge region of the housing 2. The contact resistance can be reduced by surface treatment, e.g. by gold plating. The gas compartment unit 1 also comprises feed lines and outlet lines 6e and 7 for the electrode gas, a supporting structure 3 for supporting the gas diffusion electrode 5, and an electrode support grid 4 on which the entire surface of the gas diffusion electrode 5 rests. Each of the four gas compartments 1a, 1b, 1c, 1d comprises a gas diffusion electrode 5, which is attached in a gas-tight manner in the edge region of the gas compartment module and which at the same time is electrically connected here. When gas diffusion electrodes are employed which have a conductive back face, there is complete electrical contact via the electrode support grid.

Figure 5A:
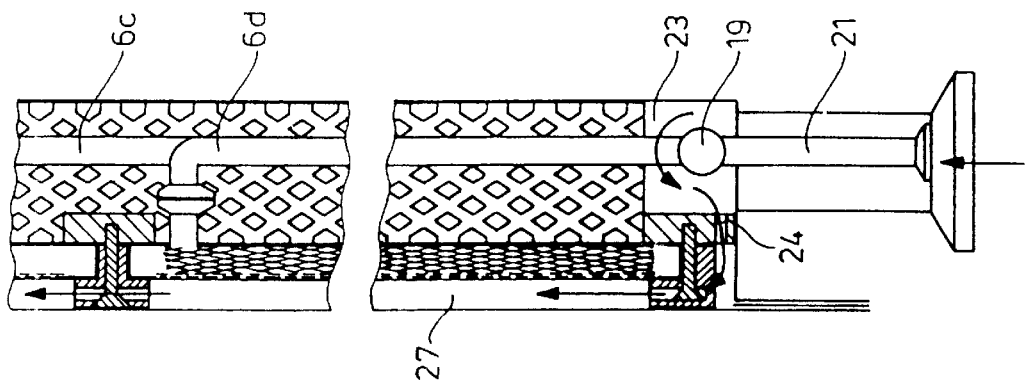
FIG. 5a is a cross-section along line B—B', looking towards the gas inlet 21 of the half cell.
Figure 5B:
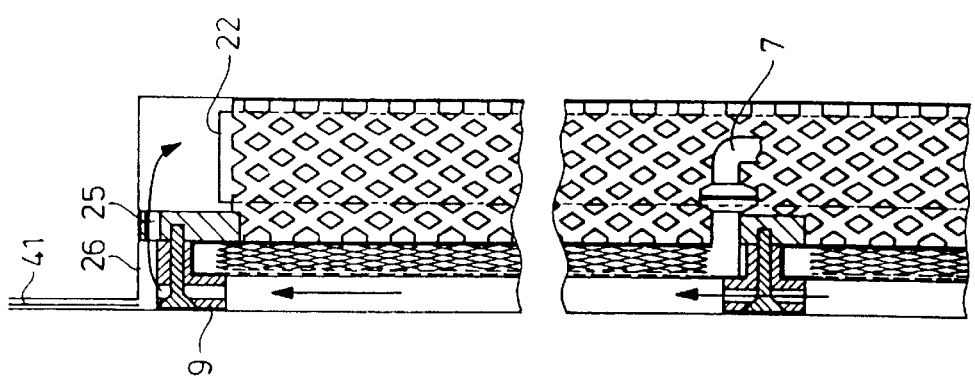
FIG. 5b shows part of a section along line C—C' in the upper part of the half cell shown in FIG. 1.

In operation, as shown in FIG. 5a, the electrolyte enters the electrolyte space 27 in front of the gas diffusion electrode 5 from the electrolyte feed line 20 through the electrolyte distributor 23, via holes 24 and further holes 10 in the horizontal clamping strips. The electrolyte flows through the electrolyte space 27 along the four gas compartment modules 1a to 1d and flows through holes in the uppermost horizontal clamping strip 9 into the electrolyte collecting duct 26. From there, the electrolyte flows off via holes 25 into the rear space behind the gas diffusion electrode and is discharged from the half cell together with excess electrode gas via a downpipe 22 (see FIG. 5b). In operation as an electrolysis cell, the half cell is closed on its front face by an ion exchange membrane 40, which ensures the passage of ions corresponding to the electrolysis reaction concerned from the half cell according to the invention to a further connected half cell or optionally in the reverse direction.

The electrode gas enters the half cell at feed line 21 and is distributed via a gas distributor 19 on to the feed lines 6a, 6b, 6c and 6d, which lead, via constrictions into the individual gas compartment modules for better gas distribution, to the four gas compartment modules 1a, 1b, 1c, 1d (see FIG. 1). The electrode gas flows through the gas compartments in the longitudinal direction, and the unconsumed excess, together with any condensate arising, emerges from the gas compartments at the opposite end, through gas overflow connection pieces 7, towards the electrolyte in the electrolyte gap. Pressure equalisation is thereby effected. From the gas overflow lines 7 the gas bubbles upwards through the space situated behind the gas compartment modules and collects in the space above the end of the connection 22. From there the gas is discharged from the half cell through the downpipe 22.

EXAMPLE 2

For operation with a conventional electrode, the gas compartment modules 1a to 1d, together with the clamping strips 8 and 9, can be removed as indicated in FIG. 3 and replaced by a nickel cathode 30 comprising an auxiliary structure 31 which serves as a power lead and as a support. The gas inlets 6a to 6d are most usefully closed. The conventional electrode, e.g. an activated nickel electrode, is fixed to the mounting structure 11 of the half cell by screwed connections 32 (see FIGS. 6 and 7). The hydrogen formed in the electrode reactions can be discharged, together with electrolyte draining off, via the downpipe 22.

What is claimed is:

1. An electrochemical half cell based on a gas diffusion electrode (5) as a cathode or anode, having a gas space, which is formed from one or more gas compartments (2a, 2b, 2c, 2d), for the gas diffusion electrode, having an ion exchange membrane (40), a holding structure (11), a gas inlet (21) and a gas outlet (22), an electrolyte feed line (20), an electrolyte discharge line (22), and a housing (13), wherein the gas diffusion electrode (5) is joined to the gas compartment or gas compartments (1a, 1b, 1c, 1d) to form a module or a plurality of modules (1a, 1b, 1c, 1d), which is detachably fastened to the holding structure (11), wherein the gas inlet (21) and the gas outlet (22) form a detachable connection to the gas compartment (2a, 2b, 2c, 2d).

2. A half cell according to claim 1, wherein the gas space is partitioned into a plurality of gas compartment modules (1a, 1b, 1c, 1d) which are optionally supplied with gas independently of each other, and which are pressure-equalized in relation to the electrolyte space (27).

3. A half cell according to claim 1, wherein the gas compartment modules (1a, 1b, 1c, 1d) are detachably fastened to the holding structure (11) independently of each other.

4. A half cell according to claim 1, wherein the gas inlets (6a, 6b, 6c, 6d) are constructed as flexible hose connections to the gas compartment (2a, 2b, 2c, 2d).

5. A half cell according to claim 1, wherein the gas compartment modules (1a, 1b, 1c, 1d) are positioned, placed in electrical contact and optionally sealed as regards flow in the half cell via structural elements (9), wherein the structural elements optionally at the same time form an electrolyte gap through which active flow occurs.

6. A half cell according to claim 1, wherein the gas compartment modules (1a, 1b, 1c, 1d) are placed in electrical contact with a current-carrying auxiliary structure (12) via contact elements (14, 15, 16).

7. A half cell according to claim 1, wherein the gas diffusion electrode (5) is in surface electrical contact via a support grid (4) in the interior space of the gas compartment (2a, 2b, 2c, 2d).

8. A half cell according to claim 1, wherein the cell comprises an electrolyte distributor (23) for the homogeneous supply of electrolyte to the electrolyte space (27).

9. A half cell according to claim 1, wherein the gas compartment modules (1a, 1b, 1c, 1d) are optionally replaced by conventional electrodes (30).

10. A half cell according to claim 1, wherein the gas diffusion electrode (5) is detachably joined to the modules 1a to 1d.

11. An electrochemical cell comprising the half-cell of claim 1, and using gas compartment modules (1a, 1b, 1c, 1d) or conventional electrodes (30).

* * * * *